Feb. 15, 1966 J. H. KIRKPATRICK, JR 3,235,013
AGRICULTURAL IMPLEMENTS
Filed Sept. 27, 1963 10 Sheets-Sheet 1
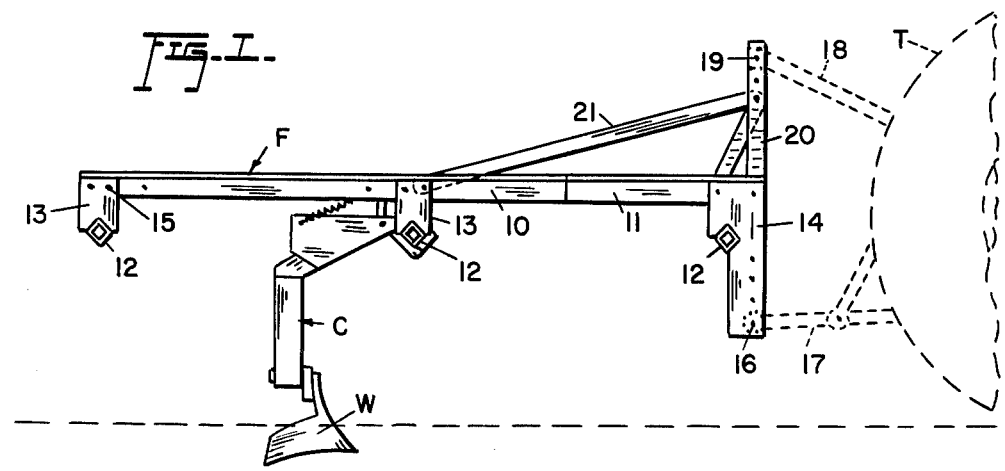
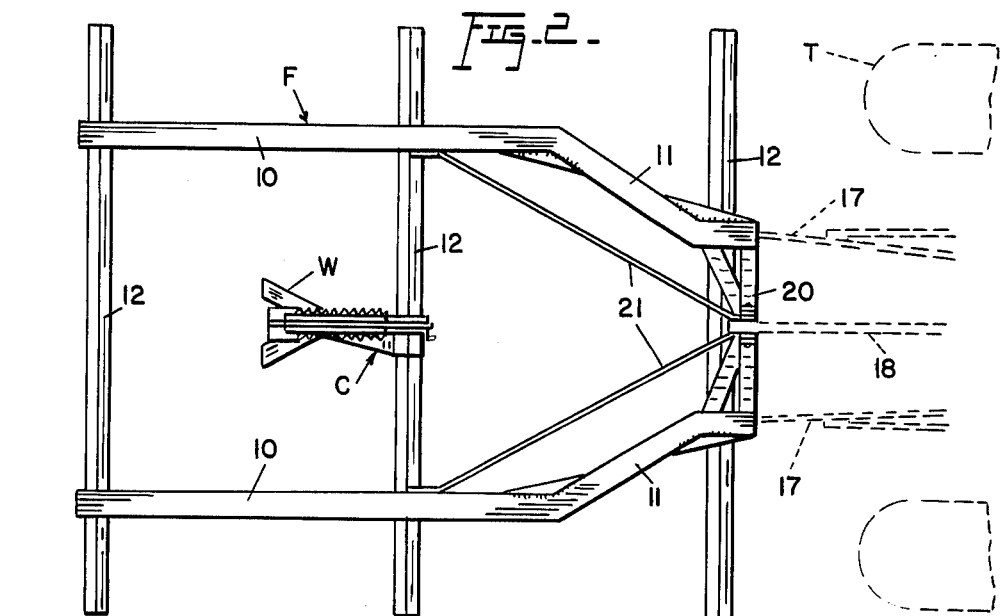
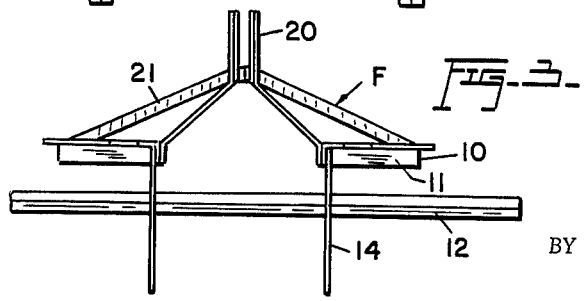
INVENTOR
JOHN H. KIRKPATRICK, JR.
BY
ATTORNEY

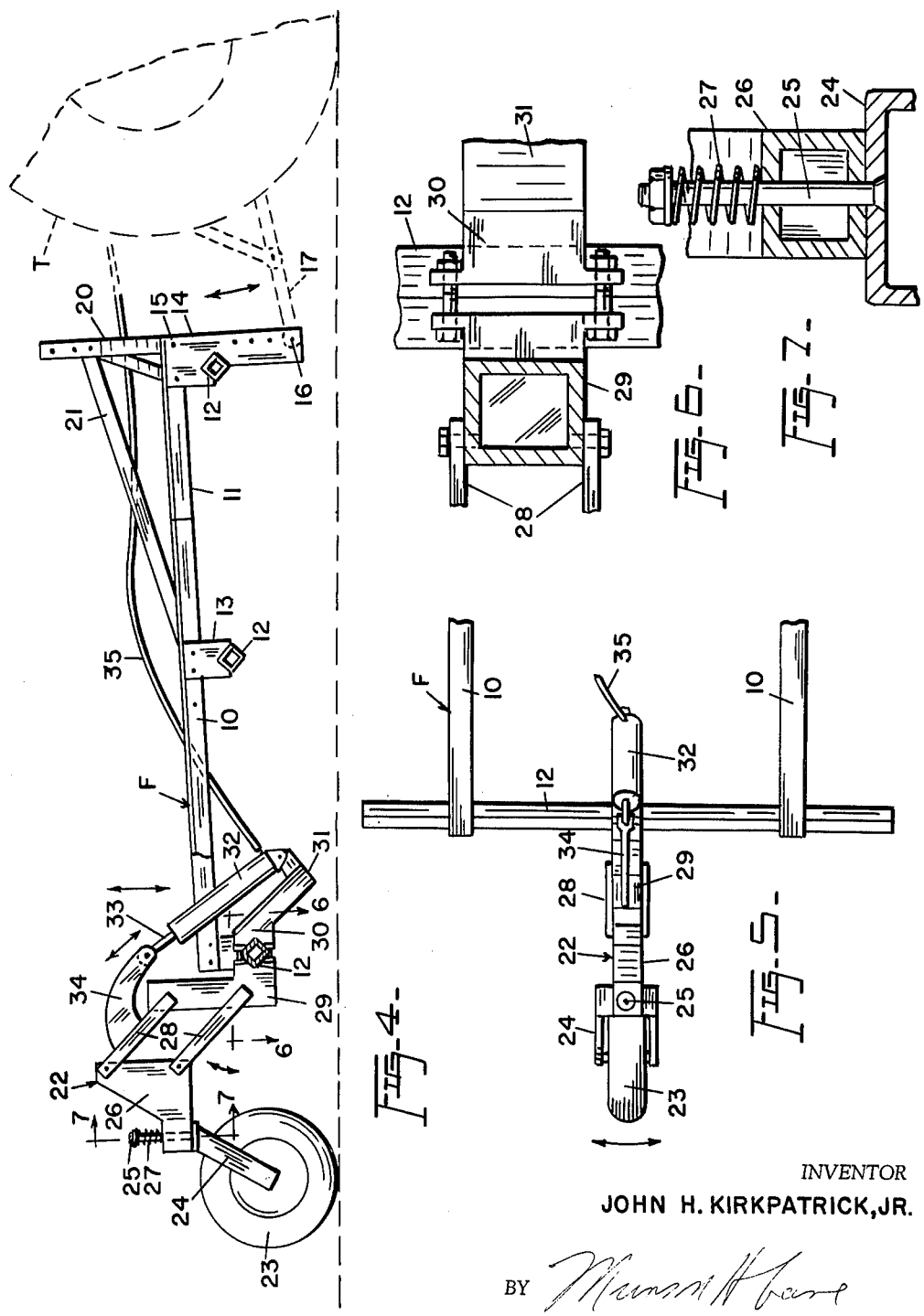

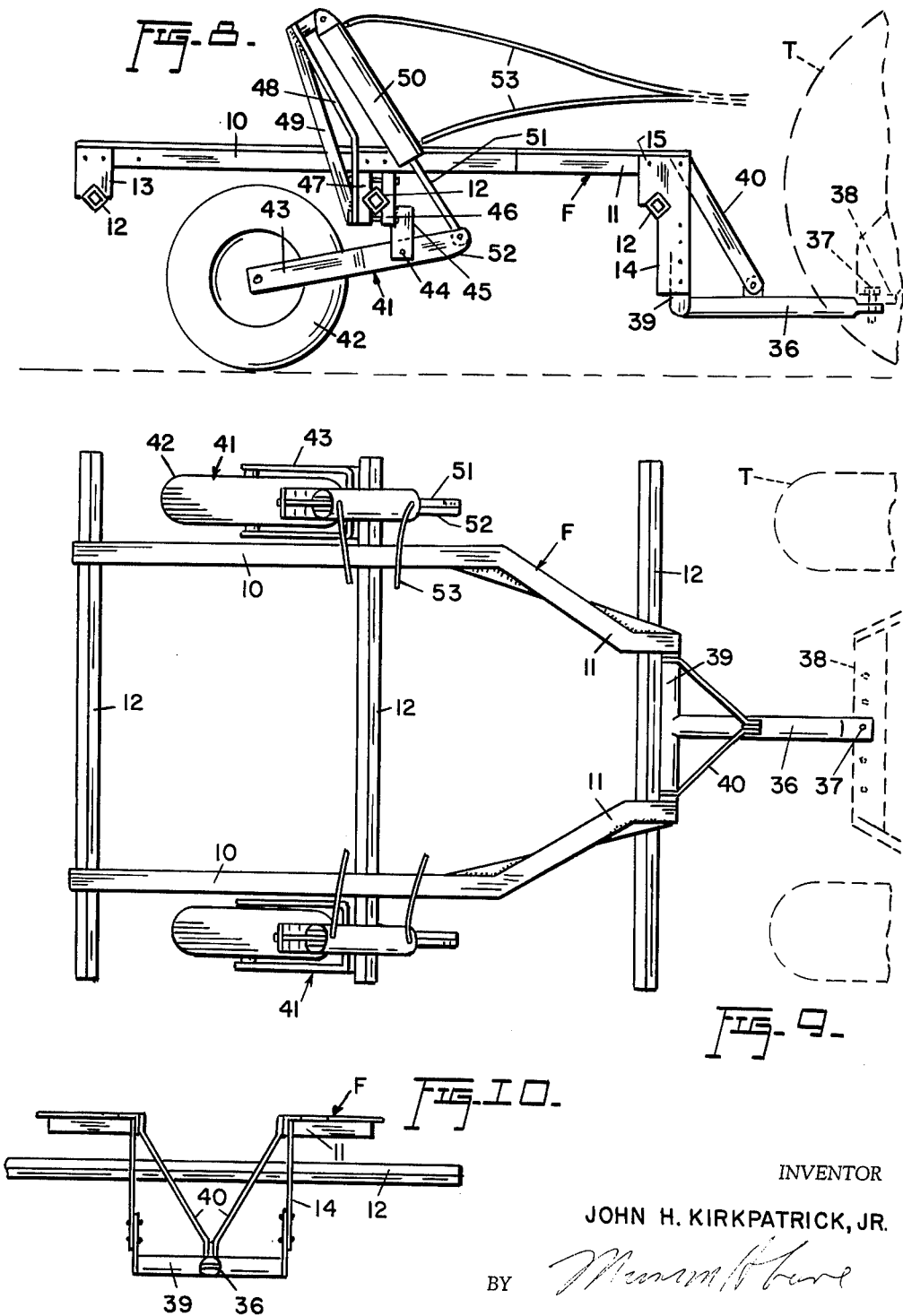

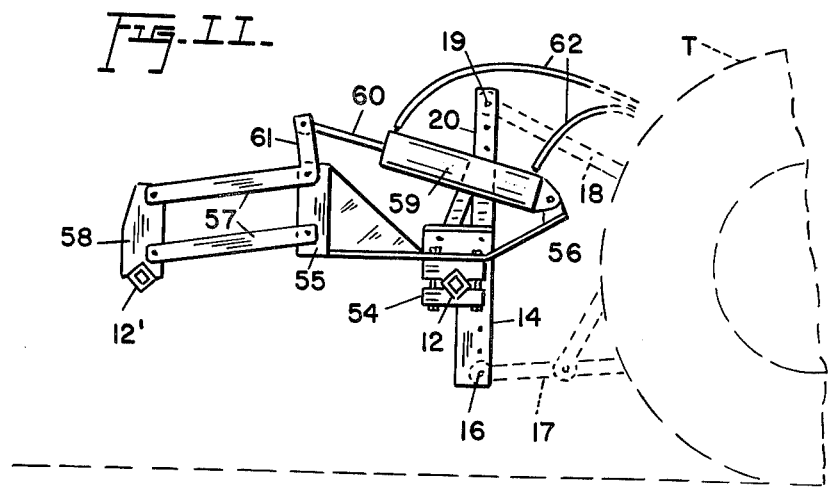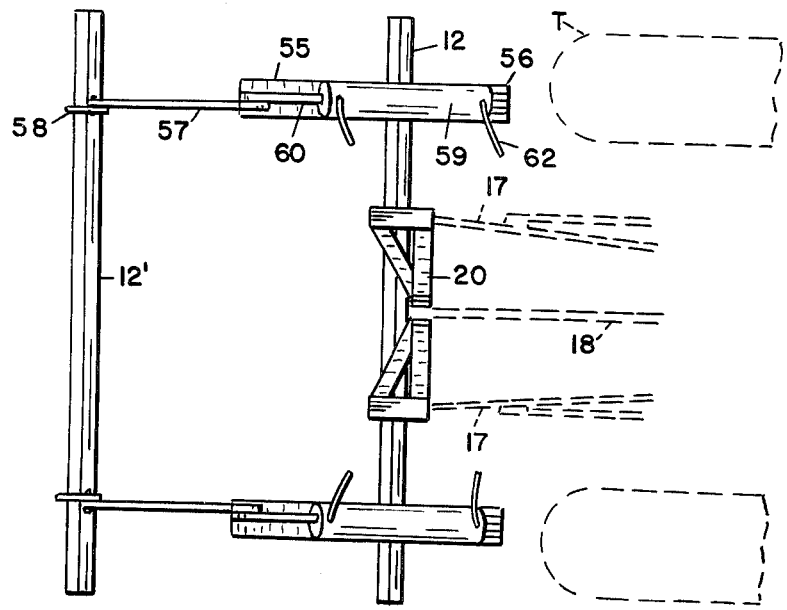

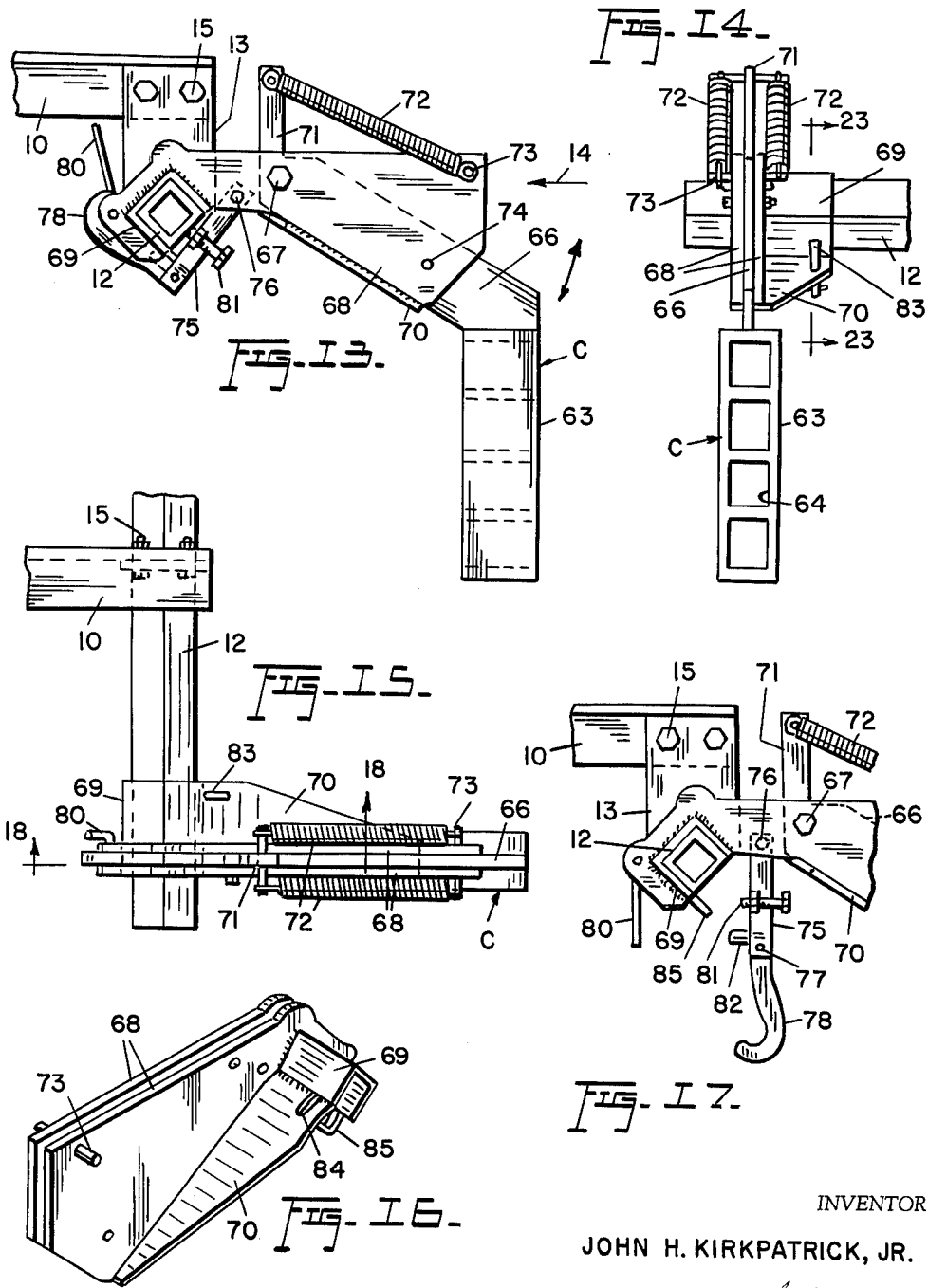

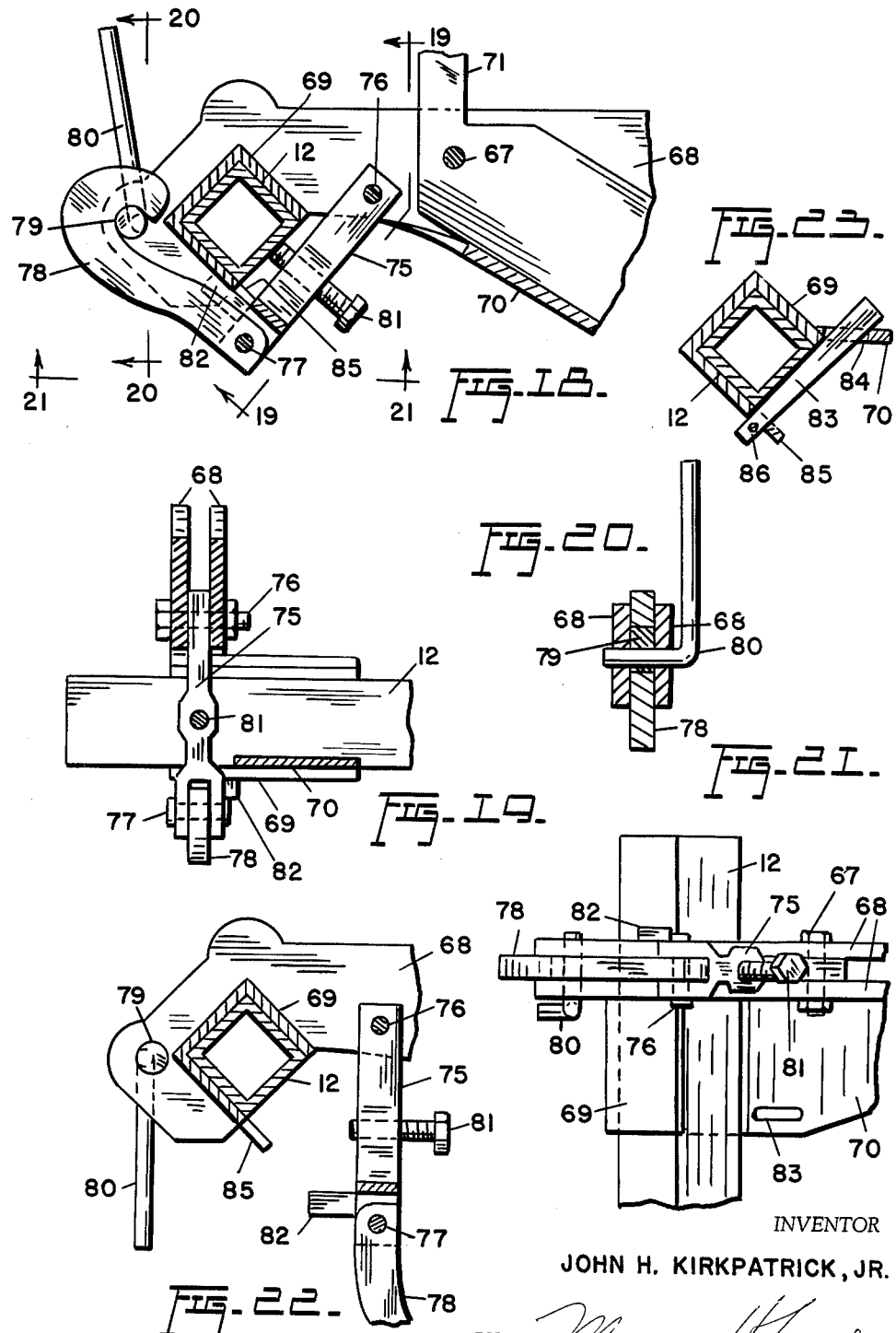

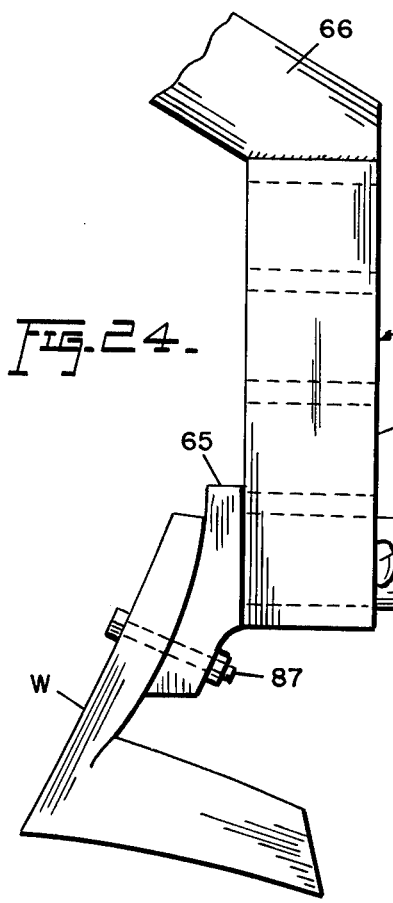
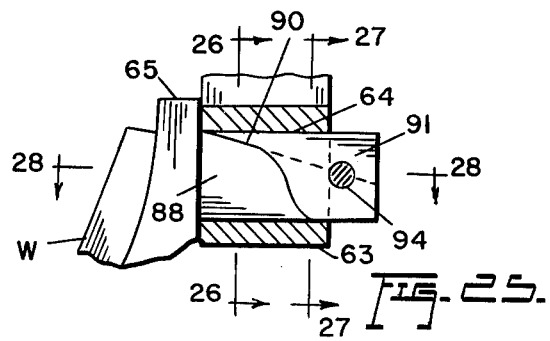
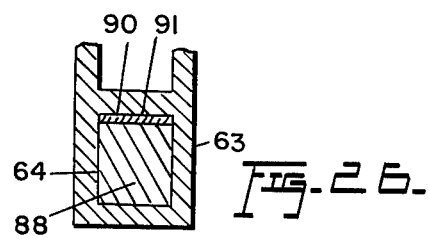
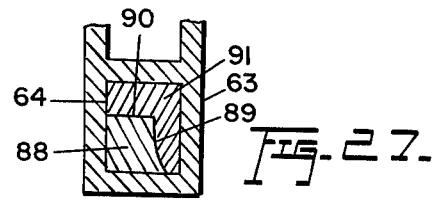
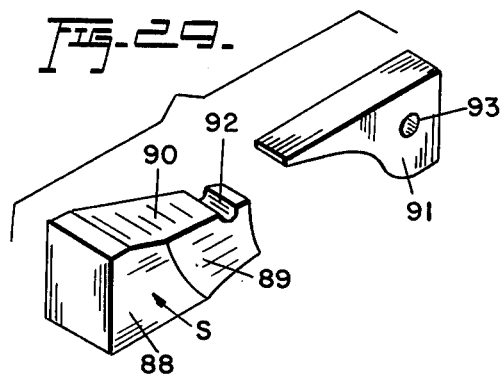
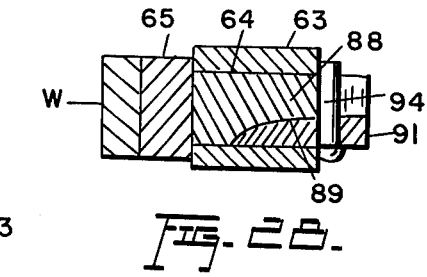
INVENTOR
JOHN H. KIRKPATRICK, JR.
BY
ATTORNEY Feb. 15, 1966     J. H. KIRKPATRICK, JR     3,235,013
AGRICULTURAL IMPLEMENTS
Filed Sept. 27, 1963     10 Sheets-Sheet 8
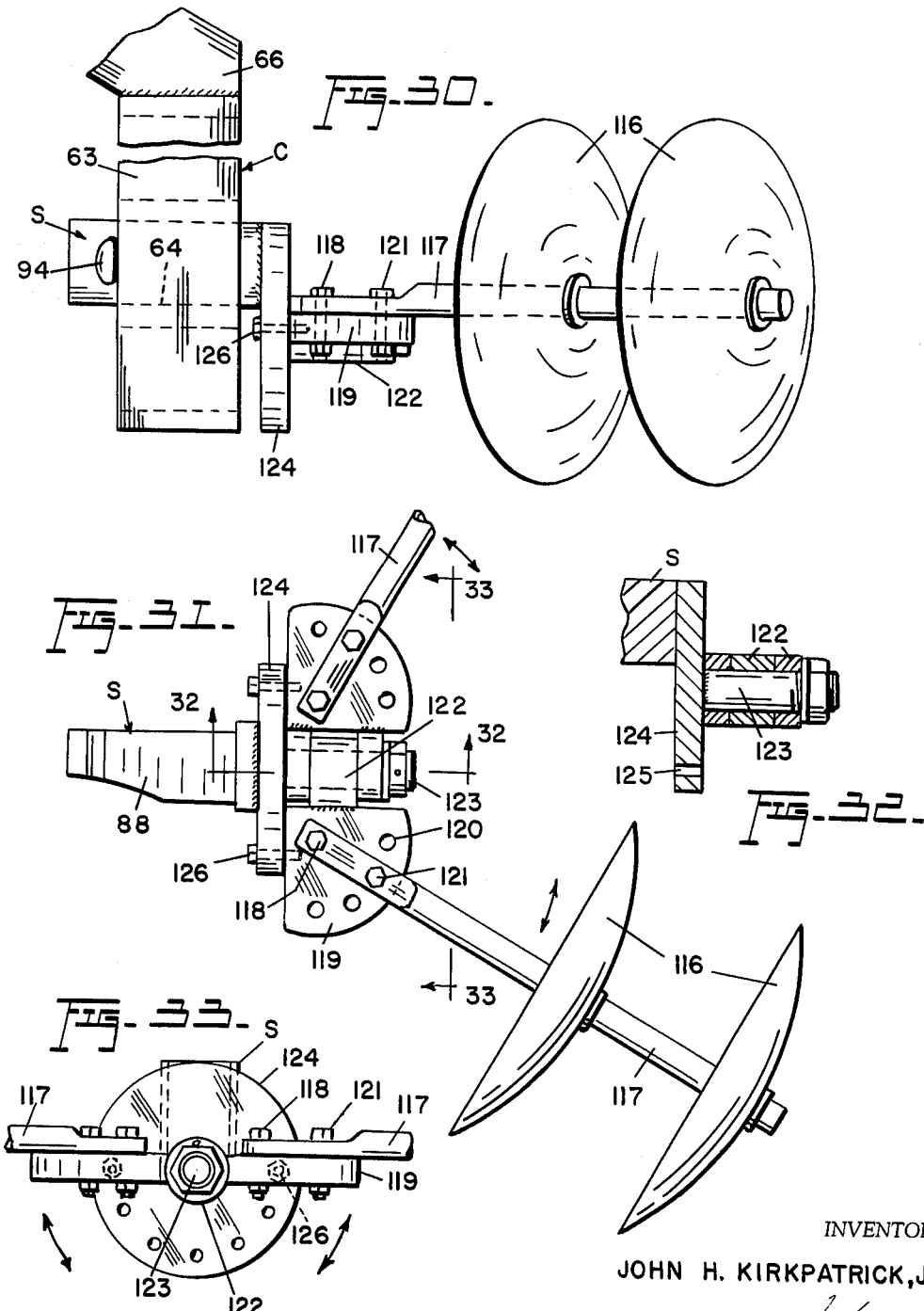
INVENTOR
JOHN H. KIRKPATRICK, JR.
BY
ATTORNEY Feb. 15, 1966 J. H. KIRKPATRICK, JR 3,235,013
AGRICULTURAL IMPLEMENTS
Filed Sept. 27, 1963 10 Sheets-Sheet 9
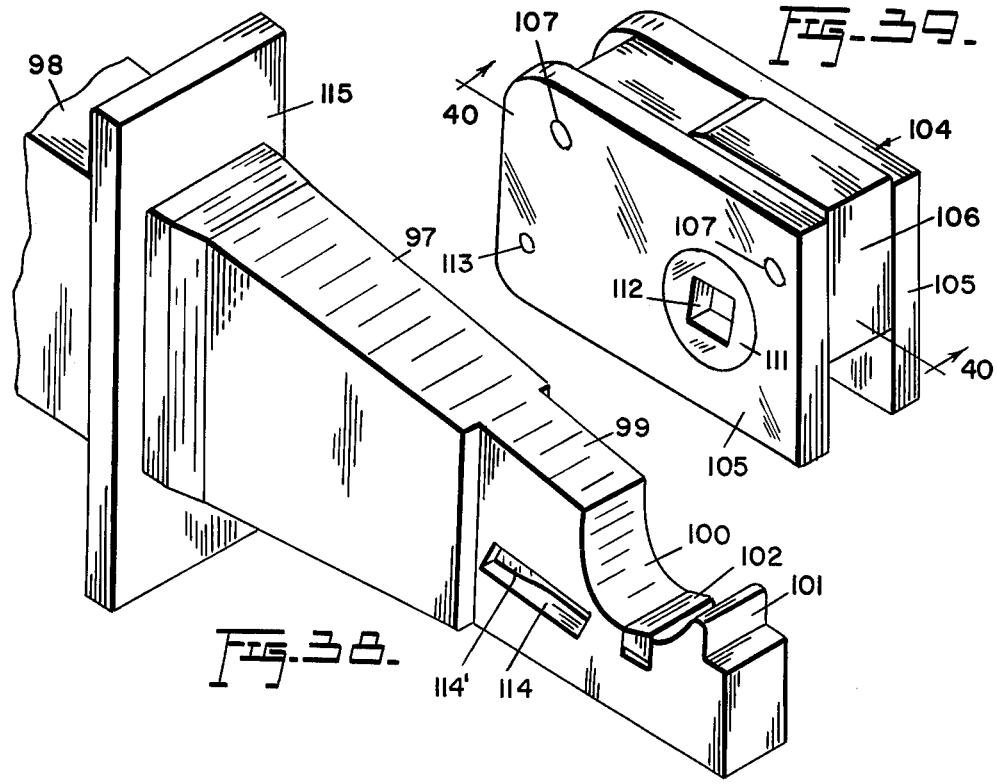
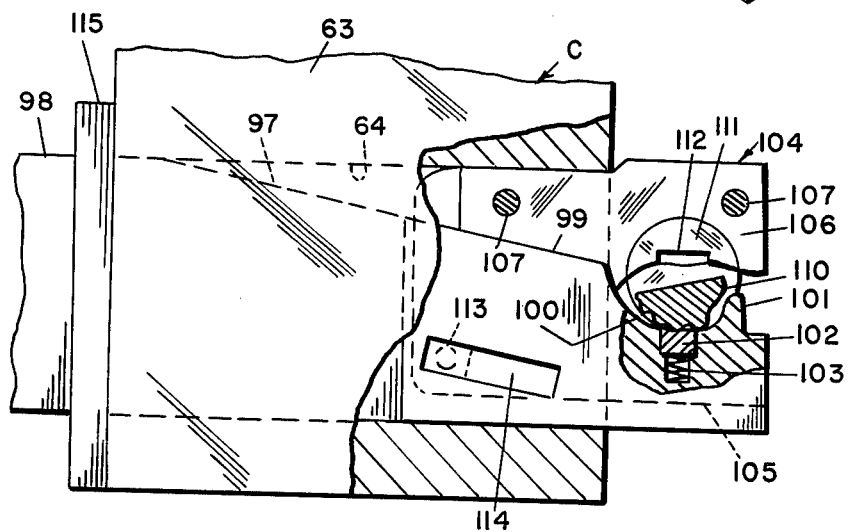
INVENTOR.
JOHN H. KIRKPATRICK, JR.
BY
ATT'Y.

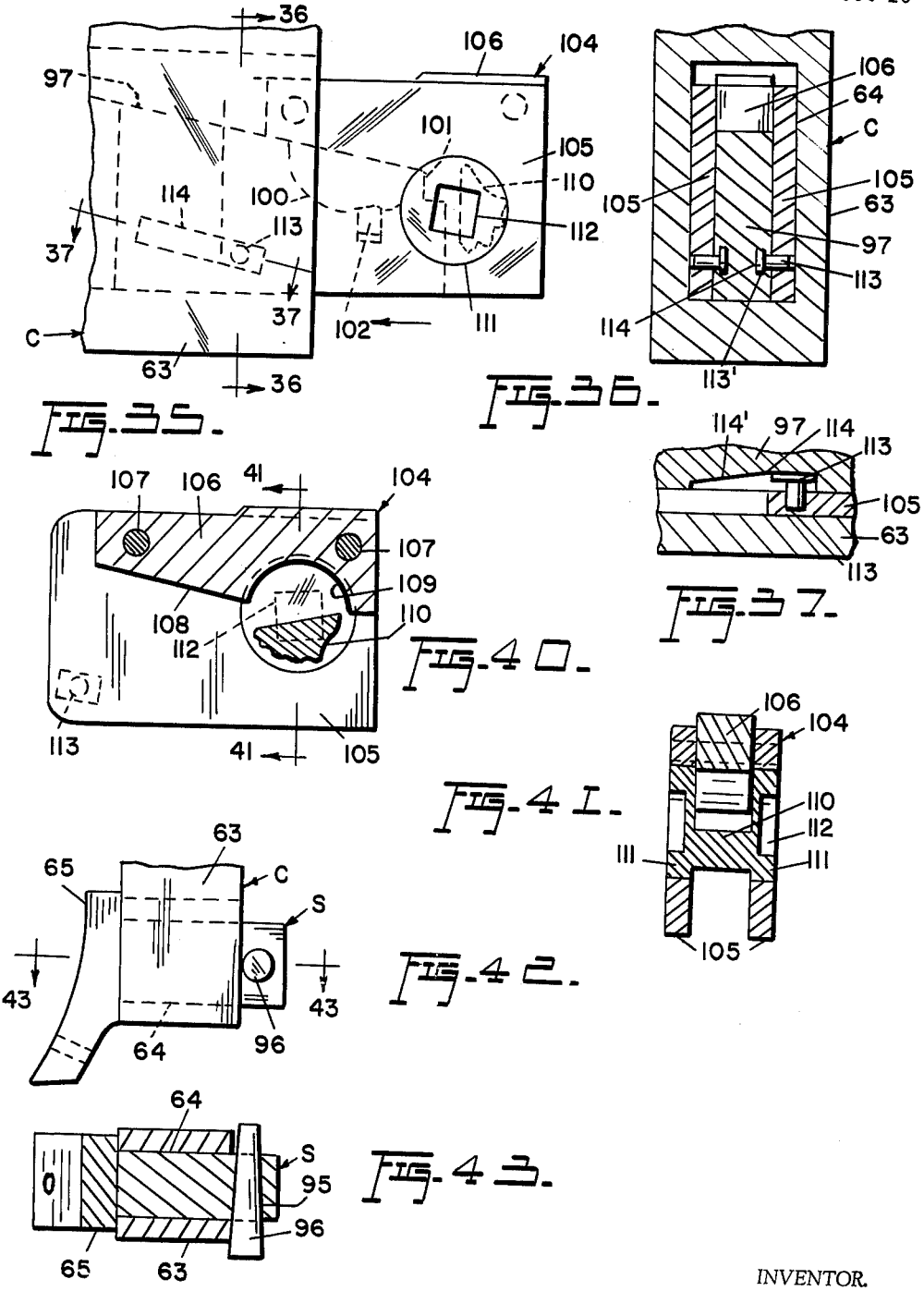

United States Patent Office 3,235,013
Patented Feb. 15, 1966

3,235,013
AGRICULTURAL IMPLEMENTS
John H. Kirkpatrick, Jr., Mulbrook Farm, R.R. 1,
Clyde, N.C.
Filed Sept. 27, 1963, Ser. No. 312,083
17 Claims. (Cl. 172—413)

This invention relates to new and useful improvements in agricultural implements and more specifically concerns itself with implements for working the soil.

In conventional practice it is necessary for a farmer to have several different implements to perform various different soil working operations, for example, plowing, disking, harrowing, clod breaking, sub-soil working, cultivating, et cetera. Moreover, in many of these different operations the farmer employs several different soil working tools on the same implement, so as to accommodate various densities of soil being worked, or to work the soil in some particular desired manner. As a result, the farmer has on hand a variety of implements with a variety of different soil working tools, which requires a considerable investment in farming machinery. Also, a considerable amount of valuable time is lost when changing over from one implement to another or substituting one tool or set of tools for another in the same implement, being borne in mind that conventional tools are usually attached to their carrier by bolts and nuts, so that the change over of multiple tools is a formidably tedious task. In addition, each implement is usually constructed to accommodate a particular tool or a set of tools, so that it is virtually impossible to use the same tool or set of tools on another implement, especially when implements made by different manufacturers are involved.

It is, therefore, the principal object of this invention to eliminate the various disadvantages of conventional equipment as above outlined, this object being attained by the provision of what may be referred to as an agricultural kit, through the facilities of which a farmer may perform a wide variety of soil working operations in a selective manner.

As such, the agricultural kit in accordance with the invention comprises a basic implement frame which may be selectively carried by a three-point hitch of a tractor, or raised and lowered while being drawn by a two-point hitch, or by a simple drawbar. The kit also includes a set of tool carriers which are attachable at selected locations to the implement frame in a quick and convenient manner and may be detached therefrom with equal expediency. In addition, the kit includes a variety of different soil working tools which are readily attachable to and detachable from the carriers, with adjustment means being provided for orienting the tools relative to the ground as desired.

The various components of the kit are standardized so that both the carriers and the tools may be quickly and easily interchanged, in fact, the arrangement of the invention is such that a farmer, having the kit in his possession, can readily assembly his own particular implement with an appropriate tool or a set of tools to perform a particular soil working operation, and when that particular operation is completed, he may readily disassemble the implement and construct another to suit another operational requirement.

It will be apparent from the foregoing that by virtue of the agricultural kit, a farmer will have at his disposal highly versatile, selectively and universally usable equipment for performing the various soil working operations which are encountered, without the necessity of tying up capital in a variety of different conventional implements such as are capable of performing one particular operation only. The universal nature of the components of the kit will enable the farmer to interchange the same with speed and convenience, and to economically replace them from standard stock, so to speak, when replacement thereof becomes necessary. In addition, the various adjustments provided will enable the components to be assembled and arranged to suit the requirements of any particular soil working condition, and as an overall entity the agricultural kit of the invention will enable the farmer to perform his soil working tasks with much greater speed, convenience, efficiency and economy than is possible with equipment of conventional nature.

With the foregoing objects and features in view and such other objects and features as may become apparent as this specification proceeds, the invention will be understood from the following description taken in conjunction with the accompanying drawings, wherein like characters of references are used to designate like parts, and wherein:

FIGURE 1 is a side elevational view showing the basic implement frame attached to a three-point tractor hitch and also showing a typical tool carrier and tool supported by the frame;

FIGURE 2 is a top plan view of the subject shown in FIGURE 1;

FIGURE 3 is a front end view of the frame per se, shown in FIGURES 1 and 2;

FIGURE 4 is a side elevational view of the frame connected to a two-point tractor hitch and equipped with caster means at the rear end thereof;

FIGURE 5 is a fragmentary top plan view of the frame and caster means;

FIGURE 6 is an enlarged, fragmentary sectional detail, taken substantially in the plane of the line 6—6 in FIG. 4;

FIGURE 7 is an enlarged, fragmentary sectional detail, taken substantially in the plane of the line 7—7 in FIGURE 4;

FIGURE 8 is a side elevational view of the frame attached to a tractor by a simple drawbar and equipped with travelling wheels;

FIGURE 9 is a top plan view of the subject shown in FIGURE 8;

FIGURE 10 is a front end view of the frame per se, shown in FIGURES 8 and 9;

FIGURE 11 is a side elevational view, similar to that shown in FIGURE 1, but illustrating a modified arrangement of the frame;

FIGURE 12 is a top plan view of the subject shown in FIGURE 11;

FIGURE 13 is a fragmentary side elevational view on an enlarged scale, showing a typical tool carrier attached to the frame;

FIGURE 14 is an elevational view, taken in the direction of the arrow in FIGURE 13;

FIGURE 15 is a top plan view of the subject shown in FIGURES 13 and 14;

FIGURE 16 is a perspective view of a typical tool carrier hanger;

FIGURE 17 is a fragmentary elevational view, similar to that shown in FIGURE 13, but illustrating the carrier hanger as being applied to or removed from the frame;

FIGURE 18 is an enlarged, fragmentary sectional view, taken substantially in the plane of the line 18—18 in FIGURE 15;

FIGURE 19 is a sectional detail, taken substantially in the plane of the line 19—19 in FIGURE 18;

FIGURE 20 is a sectional detail, taken substantially in the plane of the line 20—20 in FIGURE 18;

FIGURE 21 is a sectional detail, taken substantially in the plane of the line 21—21 in FIGURE 18;

FIGURE 22 is a fragmentary sectional view, similar to that shown in FIGURE 18 but illustrating the fastening means of the carrier hanger released;

FIGURE 23 is an enlarged section detail, taken substantially in the plane of the line 23—23 in FIGURE 14;

FIGURE 24 is a fragmentary side elevational view of a typical tool carrier and a tool supported thereby;

FIGURE 25 is a fragmentary vertical sectional view showing the attachment of the tool support to the carrier;

FIGURE 26 is a sectional view, taken substantially in the plane of the line 26—26 in FIGURE 25;

FIGURE 27 is a sectional view, taken substantially in the plane of the line 27—27 in FIGURE 25;

FIGURE 28 is a sectional view, taken substantially in the plane of the line 28—28 in FIGURE 25;

FIGURE 29 is a group perspective view showing the tool support fastening means of FIGURES 25–28;

FIGURE 30 is a fragmentary side elevational view showing a modified tool support and disk type tools;

FIGURE 31 is a fragmentary top plan view of the subject shown in FIGURE 30;

FIGURE 32 is a fragmentary sectional view, taken substantially in the plane of the line 32—32 in FIGURE 31;

FIGURE 33 is a fragmentary sectional view, taken substantially in the plane of the line 33—33 in FIGURE 31;

FIGURE 34 is a fragmentary side elevational view, partly in section, showing a modified tool support attached to the carrier;

FIGURE 35 is a fragmentary view, similar to that shown in FIGURE 34, but illustrating the modified tool support during installation;

FIGURE 36 is a sectional view, taken substantially in the plane of the line 36—36 in FIGURE 35;

FIGURE 37 is a fragmentary sectional view, taken substantially in the plane of the line 37—37 in FIGURE 35;

FIGURE 38 is a perspective view of the modified tool support used in FIGURES 34–37;

FIGURE 39 is a perspective view of the locking device of the tool support used in FIGURES 34–37;

FIGURE 40 is a sectional view, taken substantially in the plane of the line 40—40 in FIGURE 39;

FIGURE 41 is a sectional view, taken substantially in the plane of the line 41—41 in FIGURE 40;

FIGURE 42 is a fragmentary side elevational view showing another modified embodiment of the tool support and locking means; and FIGURE 43 is a cross-sctional view, taken substantially in the plane of the line 43—43 in FIGURE 42.

Referring now to the accompanying drawings in detail, the invention consists of what may be referred to as an argicultural kit of selectively and universally usable components which may be quickly and easily assembled by a farmer into an implement for performing a particular soil working operation, including simultaneously performed different phases of that operation, as by diverse tools. The implement so assembled may be ajusted with speed and convenience to suit different working conditions and upon completion of a particular work, the implement may be expeditiously dismantled by the farmer and reassembled into some other form for performing a different soil working operation.

As such, the argicultural kit in accordance with the invention embodies a basic frame which is designated generally by the reference character F in FIGS. 1–5 and 8–10. The frame F comprises a pair of spaced parallel angle bars or side members 10 having convergent front end portions 11, and a plurality of transversely extending members or cross members 12 which project laterally beyond the side members of the frame, as shown. The cross members 12 are preferably of a hollow, square cross-section and are welded to plate-like brackets 13, 14, which in turn are attached to the side members 10 and portions 11 thereof, respectively, by suitable bolts 15. The brackets 14 are apertured to selectively receive fasteners 16 for attachment thereof to the lower arms 17 of a conventional three-point hitch of a tractor T as shown in FIGS. 1–3, while the upper arm 18 of the three-point hitch is attached by a fastener 19 to an upstanding bracket assembly 20 provided as a component of the frame on the front end portions 11 of the frame members 10. The bracket assembly 20 is reinforced to the side members 10 by suitable braces 21, as shown, and it will be apparent from the foregoing that when the three-point hitch of the tractor T is actuated, the entire frame F will be raised or lowered relative to the ground, as desired.

The cross members 12 of the frame F carry one or more soil working tools, exemplified by the reference character W, which are attached to the frame by carriers, a typical of which is illustrated at C. The cross members 12 are spaced longitudinally of the frame F and the tool carriers C may be attached to the cross members at any point along the length of the latter, so that the tools W may be spaced as desired, both longitudinally and transversely of one another, to properly work soil.

In the arrangement shown in FIGS. 1–3, the entire frame F is supported solely by the three-point hitch of the tractor T and may be raised and lowered as well as drawn thereby. In the arrangement of FIGS. 4–5, the upper arm 18 of the three-point hitch is not utilized, so that only the two lower arms 17 of the hitch connect the frame to the tractor in a two-point hitch fashion. In this instance the front end of the frame may be raised and lowered by the hitch arms 17, while the rear end of the frame is supported by adjustable caster means 22. The latter consist of a ground engaging wheel 23, rotatably mounted in a yoke 24 which is attached by a vertical pivot pin 25 to a support member 26, resilient biasing means 27 being provided on the pivot pin 25 as shown for shock absorbing purposes. The support member 26 is connected by parallelogram linkage 28 to a carrier 29 which, in turn, is rigidly secured to the cross member 12 at the rear end of the frame F by a suitable clamp 30. The clamp 30 is provided with an extension 31 which has mounted thereon a hydraulic cylinder 32, the piston rod 33 of which is operatively connected to a crank 34, rigid with the parallelogram linkage 28, so that when the cylinder 32 is energized by fluid pressure delivered from a hydraulic system of the tractor T through a flexible hose or hoses 35, the support member 26 may be forced downwardly relative to the carrier 29 and the rear end of the frame F raised accordingly, relative to the ground. The cylinder 32 may be double-acting for also lowering the rear end of the frame, or gravity may be relied upon for that purpose, if desired. Thus, the caster means 22 serve not only to permit travel of the frame along the ground, but also to raise and lower the rear end portion of the frame, quite independently of the raising and lowering of the front end portion as facilitated by the tractor hitch arms 17, whereby the frame may assume any desired position relative to the ground. Since the rear end of the frame F swings in a horizontal arc when the tractor F negotiates a curve, the swinging movement of the frame is accommodated by the master wheel 23 which, of course, is swingable about the axis of the pivot pin 25.

FIGURES 8–10 illustrate another type of attachment of the frame F to the tractor, in which instance a simple drawbar 36 is utilized, the same being pivoted as at 37 to a tow bar 38 of the tractor and being secured at its rear end to a yoke 39, attached to the aforementioned brackets 14. Suitable braces 40 are provided between the brackets 14 and the drawbar 36 as shown, and in this arrangement the frame F is simply drawn behind the tractor, without being raised or lowered thereby. Accordingly, a pair of travelling wheel units 41 are provided intermediate the ends and at opposite sides of the frame F, each of these units consisting of a ground engaging wheel 42 rotatably mounted in a yoke 43 which is pivoted as at 44 to a bracket 45 for vertical swinging movement of the yoke. The bracket 45 is secured to a clamp component 46 which coacts with a complemental clamp component 47 to secure the entire wheel unit 41 to a cross member 12 intermediate the ends of the frame F. The clamp component 47 carries an arm 48, held rigid by a brace 49, and supporting a hydraulic cylinder 50, the piston rod 51 of which is operatively connected to a crank-like extension 52 of the yoke 43. Thus, when the cylinder 50 is energized by fluid pressure delivered thereto through flexible hoses 53 from the hydraulic system of the tractor T, the travelling wheel 42 may be raised or lowered relative to the frame F, so as to correspondingly lower or raise the frame relative to the ground.

In the modified arrangement shown in FIGS. 11 and 12, the frame F as such does not include the side members 10, 11, but does have a leading cross bar 12 supported by the brackets 14 on the three-point hitch 17, 18 of the tractor. The cross member or bar 12 in this instance has mounted thereon a pair of clamps 54 provided with bracket means 55, 56, the bracket means 55 serving to mount parallelogram linkage 57 which, in turn, carries brackets 58 supporting a second cross member 12' in rearwardly spaced relation from the leading cross member 12. The bracket means 56 serve to mount a pair of hydraulic cylinders 59, the piston rods 60 of which are operatively connected to cranks 60 of the parallelogram linkage 57, so that when the cylinders 59 are energized by fluid from the hydraulic system of the tractor, the second cross member 12' (and tools carried thereby) may be raised or lowered relative to the leading cross member 12. It is to be noted that this arrangement may be repeated in series, so that in the manner just described a third cross member (not shown) is supported for raising and lowering movement by the second cross member 12', et cetera. Flexible hoses for delivering fluid under pressure to the cylinders 59 are indicated at 62. It may be also pointed out that while the arrangement of FIGS. 11 and 12 is shown in conjunction with the three-point tractor hitch 17, 18, a two-point hitch arrangement as shown in FIGS. 4–7 may be utilized if the caster means 22 are also provided, or a simple drawbar arrangement of FIGS. 8–10 may be used in conjunction with the travelling wheels 41, if so preferred.

The remaining portion of this description deals primarily with attachment of the tool carriers C to the cross members 12 (or 12') of the frame F and with attachment of the soil working tool W to the tool carriers. The tool carrier and tool attachments as hereinafter described are applicable selectively to all forms or embodiments of the basic frame structure disclosed in FIGS. 1–12, regardless of which type of hitch or drawbar connection to the tractor, such as may be employed.

Accordingly, reference is now drawn to FIGURES 13–23 which show a typical tool carrier C in the form of a vertically elongated block 63 which is provided with a row of vertically spaced, rectangular openings 64 to selectively receive shanks S of supports 65 of the soil working tools W, illustrated in FIGS. 24–43. The tool carrier block 63 has secured to its upper end a web 66 which is mounted on a pivot pin 67 between a pair of spaced parallel hanger plates 68. The latter are secured to a socket member of a C-shaped cross-section, illustrated at 69, which is readily applicable to, removable from and slidably adjustable on the cross member 12. A reinforcing gusset 70 is secured to lower edges of the plates 68 and to the socket member 69 to one side of the plates, as shown. An upwardly projecting arm 71 is provided on the pivoted end portion of the web 66 and has anchored thereto one end of a pair of tension springs 72, the other ends of which are anchored to the plates 68 as at 73. The springs 72 exert a force on the web 66 which biases the tool carrier C downwardly and forwardly, but the resiliency of the springs permits the tool carrier to retract rearwardly and upwardly, if tools on the carrier encounter obstructions in the soil. The tool carrier C, however, may be locked in its projected position wherein the web 66 engages the gusset 70, by means of a removable locking pin 74 inserted in registering apertures provided in the plates 68 and web 66 therebetween, as will be clearly apparent.

When the tool carrier C is applied to the cross member 12, means are provided for positively locking the socket member 69 at a selected point to the cross member. These means include a link 75 which is pivoted at 76 between the plates 68 and has pivotally connected to its free end as at 77 a hook 78. The bill portion of the hook 78 is adapted to receivably engage a cam 79 which is rotatably disposed between the plates 68 and secured to an actuating crank 80, rotatably journalled in the plates 68. An intermediate portion of the link 75 is provided with a locking set screw 81, and when the socket member 69 is applied to the cross member 12, the screw 81 comes in abutment with the member 12 through the open side of the member 69, while the bill portion of the hook 78 is engaged with the cam 79. The cam is then rotated by actuation of the crank 80 so as to positively tighten the parts in assembled relation. In addition, a projecting lug 82 is provided on one side of the link 75 adjacent the pivot 77, and this lug comes into abutment with the socket member 69 exteriorly of the plates 68 and more-or-less in parallel with the locked hook 78, as illustrated. Moreover, to further assist in locking the tool carrier on the member 12, a tapered locking pin or wedge 83 is inserted through an aperture or slot 84 in the gusset 70 and through a similar slot in an ear 85 provided on the socket member 69, the pin or wedge 83 being held in place by a removable keeper pin 86, as is best shown in FIGURE 23.

Attention is now directed to FIGS. 24–29 which show one type of fastening of the shank S of the support 65 of the soil working tool W to the block 63 of the tool carrier C. As already noted, the block 63 is provided with a row of vertically spaced, rectangular openings 64 to selectively receive the shank S, the shank being shown as welded or otherwise secured to the support 65 to which the tool W is removably attached, as for example, by the fastening means 27. The shank S is in the form of a plug 88 which fits freely into any one of the openings 64, but the plug is also wedge-shaped in that it has a side cam surface 89 and a top cam surface 90, for cooperation with a complementally shaped locking member 91. The plug 88 is formed with a transverse groove 92 and the locking member 91 is provided with an aperture 93 registrable with the groove, the groove and the aperture receiving a keeper pin 94 which, when driven into place, causes the member 91 to cooperate with the cam surfaces 89 and 90 of the plug 88 so as to spread the member 91 and plug 88 apart in both the vertical and the horizontal direction, thus firmly wedging the same in the opening 64 of the carrier block 63. This wedging action takes place when the tool support 65 abuts the carrier body 63 at one side and the head of the keeper pin 94 abuts the body 63 at the relatively opposite side, so that it is virtually impossible for the shank S to become loose until the keeper pin 94 is withdrawn.

At this point it may be observed that FIGS. 42 and 43 illustrate a considerably simpler arrangement wherein the shank S of the tool support 65 is simply formed with a bore 95 to receive a keeper pin 96 which, when driven into the bore, holds the shank in position. The pin 96 and the bore 95 are preferably tapered so as to frictionally lock the pin in place.

As another alternative, FIGS. 34–41 show shank locking means wherein the shank or plug 97 of the tool support 98 has an upper cam surface 99 formed with a concavity 100, the concavity having an upwardly projecting nose portion 101 and being also provided with a depressible locking dog 102, biased upwardly by a compression spring 103, the dog 102 being held against separation from the plug 97 in any suitable manner.

The plug 97 cooperates with a locking device 104 which includes a pair of spaced parallel side plates 105 with a block 106 secured therebetween by rivets, or the like 107. The block 106 is provided with a lower cam surface 108 for coaction with the came surface 99 of the plug 97 and is also formed with a substantially semi-circular recess 109 (see FIG. 40) to accomodate a toothed locking cam element 110 which is rotatably journalled in the side plates 105 by means of disk-like bearing members 111. The latter are provided with sockets 112 to receive a wrench, or the like, for rotating the cam element 110. The side plates 105 are apertured to slidably receive a pair of coaxial pins 113 having flat heads 113' at the inside of the plates, these heads being received in slots 114 formed in the opposite sides of the plug 97. The slots 114 have cam surfaces 114' for engagement by the heads 113', as is best shown in FIG. 37.

An abutment plate 115 is provided on the plug 97 adjacent the tool support 98 and when the plug is inserted into one of the openings 64 in the tool carrier C, the plate 115 comes in abutment with the carrier at one side, while the plug projects from the relatively opposite side of the carrier. The locking device 104 is then applied to the projecting portion of the plug in the manner illustrated in FIGURE 35, with the cam element 110 being turned to the position indicated. Then, rotation is imparted to the cam element so that it passes over the nose portion 101 of the plug while the block 106 of the locking device rides up the cam surface 99 of the plug, and when the cam element ultimately reaches the position shown in FIGURE 34, the teeth thereof will come into engagement with the locking dog 102 and the dog will prevent the cam element from rotating back to its unlocked position. In the locked position of the device 104, the coaction of the block 106 with the cam surface 99 of the plug 97 will move the block and the plug vertically apart to wedge the same in the opening 64 of the carrier. At the same time, inward movement of the locking device 104 relative to the plug 97 will cause the heads 113' of the pins 113 to engage the cam surfaces 114' in the slots 114 of the plug 97, thus causing the pins to slide laterally outwardly in the side plates 105 and against the sides of the opening 64 in the carrier C, whereby to wedge the plug 97 in a horizontal direction. In this manner, a positive fastening of the tool support shank in the carrier is effected, with the advantage of both vertical and horizontal wedging action provided by the unitary locking device 104 in conjunction with the shank or plug 97, wherein the locking device may be applied to and removed from the plug as a single entity, so that the use of separate wedges, pins, or keepers is not necessary.

Finally, attention is directed to FIGS. 30–33 which illustrate a universally adjustable mount for soil working tools, in the instance shown, disks 116 rotatably mounted on a supporting shaft 117. Two such disk carrying shafts may be provided as shown. The shafts 117 have flattened end portions pivoted as at 118 to sector plates 119 which are apertured as at 120 to receive bolts 121 for locking the shafts 117 in a desired angular relation in the horizontal plane.

The sector plates 119 are provided with interfitted bearing or hinge means 122, rotatable on a spigot 123 which is affixed centrally to a circular disk 124. The latter, in turn, is secured to a mounting shank S which may be of any of the types herein described, for attachment to the tool carrier C. The disk 124 is provided with apertures 125 for selective reception of bolts 126, whereby the sector plates 119 may be locked to the disk for a selected angular relation of the shafts 117 in the vertical plane.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. An agricultural kit of selectively and universally usable components for assembling a soil working implement having selected structural and functional characteristics, said kit including a basic frame adapted for connection to a tractor, said frame having at least one cross-member of a polygonal cross-section, a tool carrier, a polygonal socket provided on said tool carrier and having one open side, said socket complementally embracing said polygonal cross-member of said frame and said open side of the socket permitting the associated tool carrier to be quickly detached from and attached to said cross member, cam-actuated releasable linkage means for closing the open side of said socket whereby to lock the same in a predetermined fixed position on said cross member, and a soil working tool removably connected to said tool carrier.

2. The kit as defined in claim 1 including at least one travelling wheel, and means for removably attaching said wheel to said cross member.

3. The kit as defined in claim 1 including at least one travelling wheel, means for removably attaching said wheel to said cross member and means for raising and lowering said wheel relative to the frame.

4. An agricultural kit of selectively and universally usable components for assembling a soil working implement having selected structural and functional characteristics, said kit including a basic frame, means provided on said frame for attaching the same to a tractor, said frame including at least one cross member of a polygonal cross-section, a tool carrier having a vertically elongated configuration, a polygonal socket provided at the upper end of said tool carrier and having an open side, said socket embracing complementally a selected portion of said polygonal cross member and said open side of the socket permitting the associated tool carrier to be quickly detached from and attached to said cross member, cam-actuated releasable linkage means for closing the open side of said socket whereby to lock the same in a predetermined fixed position on said cross member, a tool support, means on said tool support for removably attaching the same to a selected lower end portion of said carrier, and a soil working tool removably attached to said tool support.

5. The kit as defined in claim 4 wherein said means for attaching said carrier to said cross member include means pivoting said carrier for raising and lowering movement, and resilient means biasing the carrier to a lowered position.

6. The kit as defined in claim 5 together with means for selectively locking said carrier against raising and lowering movement.

7. The kit as defined in claim 4 including at least one travelling wheel for said frame, means for removably attaching said wheel to said cross member, and means for raising and lowering said wheel relative to the frame.

8. In an agricultural implement, the combination of a tool support including a horizontal spigot, a pair of plates mounted for independent swinging movement about a common horizontal axis on said spigot, means for locking said plates in a selected angular relation, a pair of elongated members pivoted in the respective plates for swinging movement toward and away from each other in planes radial to said common horizontal axis, means for locking said elongated members in a selected angular relation, and soil working tools carried by said elongated members.

9. The device as defined in claim 8 together with a vertically elongated tool carrier, and quickly attachable and detachable means for fastening said tool support to a selected point on said carrier.

10. An agricultural kit of selectively and universally usable components for assembling a soil working implement having selected structural and functional characteristics, said kit including a basic frame adapted for connection to a tractor, said frame including a first cross member of a polygonal cross-section mounted in a fixed position on said frame, a second cross member of a polygonal cross-section, means mounting said second cross member on said frame for raising and lowering movement relative to said first cross member, a plurality of tool carriers, a polygonal socket provided on each of said tool carriers and having an open side, the sockets of said tool carriers complementally embracing said first and second polygonal cross members of said frame and said open sides of said sockets permitting the associated tool carriers to be quickly detached from and attached to said cross members, cam-actuated releasable linkage for closing the open side of each socket whereby to lock the same in a predetermined fixed position on the associated cross member, and soil working tools removably connected to said tool carriers.

11. In an agricultural implement, the combination of a tool carrier provided with a rectangular opening having top and bottom walls and a pair of side walls, a tool support including a shank removably received in said opening, said shank having one side wall and a bottom wall in engagement with one side wall and the bottom wall of the opening respectively and also having a cam-surfaced opposite side wall and a cam-surfaced top wall, and a locking wedge complemental to said shank removably received in said opening, said locking wedge having one side wall and a top wall in engagement with the other side wall and the top wall of the opening respectively and also having a cam-surfaced bottom wall and a cam-surfaced side wall in wedging engagement with said cam-surfaced side wall and cam surfaced top wall of said shank respectively whereby to lock the shank in said opening, and a soil working tool carried by said tool support.

12. The device as defined in claim 11 together with a transverse keeper pin extending through said shank and through said wedge exteriorly of and in abutment with one side of said tool carrier.

13. In an agricultural implement, the combination of a frame, means provided on said frame for attaching the same to a tractor, said frame including at least one cross member of a polygonal cross-section, a vertically elongated tool carrier, a polygonal socket provided at the upper end of said tool carrier and having an open side, said socket complementally embracing said polygonal cross member and said open side of the socket permitting the associated tool carrier to be quickly detached from and attached to said cross member, cam-actuated releasable linkage means for closing the open side of said socket whereby to lock the same in a fixed position on said cross member, the lower end portion of said tool carrier being provided with a set of vertically spaced rectangular openings each having top and bottom walls and a pair of side walls, a tool support including a shank selectively and removably received in said rectangular openings, said shank having one side wall and a bottom wall in engagement with one side wall and the bottom wall respectively of the opening in which the shank is positioned and also having a cam-surfaced opposite side wall and a cam-surfaced top wall, a locking wedge complemental to said shank and removably inserted therewith in one of said openings, said wedge having one side wall and a top wall in engagement with the other side wall and the top wall respectively of the opening and also having a cam-surfaced side wall and a cam-surfaced bottom wall in wedging engagement with said cam-surfaced side wall and cam-surfaced top wall of said shank respectively whereby to lock the shank in said opening, and a soil working tool removably secured to said tool support.

14. The device as defined in claim 13 together with at least one travelling wheel for said frame, means for removably attaching said wheel to said cross member, and means for raising and lowering said wheel relative to the frame.

15. The device as defined in claim 13 wherein said frame includes a second cross member adapted to have a tool carrier mounted thereon, and means connecting the second cross member to the first mentioned cross member for raising and lowering of the second cross member relative to the first cross member.

16. In an agricultural implement, the combination of a frame cross member having a polygonal cross-section, a tool carrier including an upper portion and a lower portion, a polygonal socket provided on the upper portion of said carrier and having an open side, said socket complementally embracing said polygonal cross member and said open side of the socket permitting the associated tool carrier to be quickly detached from and attached to said cross member, cam-actuated releasable linkage means for closing the open side of said socket whereby to lock the same in a fixed position on the cross member, pivot means connecting said lower portion of said carrier to the upper portion for raising and lowering movement of the lower portion, resilient means biasing the lower portion of the carrier to its lowered position, a tool support attachable selectively at vertically spaced points to said lower portion of the carrier, and a soil working tool removably attached to said tool support.

17. The device as defined in claim 16 together with means for selectively locking said lower portion of said carrier against raising and lowering movement about said pivot means.

References Cited by the Examiner
UNITED STATES PATENTS

| | | | |
|---|---|---|---|
| 617,217 | 1/1889 | Avery | 306—1.6 |
| 669,679 | 3/1901 | Butler | 172—637 X |
| 959,683 | 5/1910 | Zollars | 172—640 |
| 995,319 | 6/1911 | Brigden | 172—744 X |
| 1,042,991 | 10/1912 | Waterman | 172—600 |
| 1,051,018 | 1/1913 | Schmidt | 172—600 |
| 1,132,335 | 3/1915 | Graves | 306—1.6 |
| 1,464,199 | 8/1923 | Caughey | 172—693 |
| 1,571,853 | 2/1926 | McCowan | 306—1.5 |
| 1,585,292 | 5/1926 | Kirkpatrick | 172—584 X |
| 1,843,863 | 2/1932 | Barch | 172—600 X |
| 2,610,417 | 9/1952 | Crawford | 37—142 |
| 2,679,793 | 6/1954 | Rolf et al. | 172—406 |
| 2,716,823 | 9/1955 | Mullin | 172—753 X |
| 2,968,356 | 1/1961 | Mydels | 172—417 X |
| 3,093,394 | 6/1963 | McCollum | 172—248 X |

FOREIGN PATENTS

| | | |
|---|---|---|
| 277,895 | 12/1951 | Switzerland. |

ABRAHAM G. STONE, *Primary Examiner.*

RUSSELL R. KINSEY, *Examiner.*